(12) United States Patent
Jiang et al.

(10) Patent No.: US 7,648,798 B2
(45) Date of Patent: Jan. 19, 2010

(54) BATTERY WITH ELECTROLYTE CONTAINING ALUMINUM SALT

(75) Inventors: Zhiping Jiang, Westford, MA (US); William L. Bowden, Nashua, NH (US); Leslie J. Pinnell, Framingham, MA (US); Michael Pozin, Brookfield, CT (US); Nikolai N. Issaev, Woodbridge, CT (US)

(73) Assignee: The Gillette Company, Boston, MA (US)

( * ) Notice: Subject to any disclaimer, the term of this patent is extended or adjusted under 35 U.S.C. 154(b) by 582 days.

(21) Appl. No.: 11/494,246

(22) Filed: Jul. 27, 2006

(65) Prior Publication Data

US 2008/0026290 A1    Jan. 31, 2008

(51) Int. Cl.
*H01M 6/04* (2006.01)
(52) U.S. Cl. .................. 429/188; 429/221; 429/231.95; 429/319; 429/326; 429/340; 429/341
(58) Field of Classification Search ......... 429/122–254, 429/255–347; 252/62.2; 29/623.1–623.5
See application file for complete search history.

(56) References Cited

U.S. PATENT DOCUMENTS

| | | | |
|---|---|---|---|
| 3,907,597 A | 9/1975 | Mellors | |
| 4,163,829 A | 8/1979 | Kronenberg | |
| 4,450,214 A | 5/1984 | Davis | |
| 4,481,267 A | 11/1984 | Bowden et al. | |
| 4,489,144 A | 12/1984 | Clark | |
| 4,808,497 A | 2/1989 | Blomgren et al. | |
| 4,891,283 A | 1/1990 | Bowden et al. | |
| 4,952,330 A | 8/1990 | Leger et al. | |
| 5,219,683 A | 6/1993 | Webber | |
| 5,229,227 A | 7/1993 | Webber | |
| 5,290,414 A | 3/1994 | Marple | |
| 5,432,030 A | 7/1995 | Vourlis | |
| 5,514,491 A | 5/1996 | Webber | |
| 5,534,370 A * | 7/1996 | Kita et al. .................... 429/337 |
| 5,691,083 A | 11/1997 | Bolster | |
| 6,218,054 B1 | 4/2001 | Webber | |
| 6,730,136 B2 | 5/2004 | Webber | |
| 6,849,360 B2 | 2/2005 | Marple | |

(Continued)

FOREIGN PATENT DOCUMENTS

EP    0 042 765    12/1981

(Continued)

OTHER PUBLICATIONS

Matsuda et al., "Characterization of the lithium-organic electrolyte interface containing inorganic and organic additives by in situ techniques", Apr. 1995, Journal of Power Sources, vol. 54, No. 2, pp. 301-305.

(Continued)

*Primary Examiner*—Basia Ridley
*Assistant Examiner*—Jonathan G Leong
(74) *Attorney, Agent, or Firm*—Fish & Richardson P.C.

(57) ABSTRACT

A battery having an anode including an alkali metal as the active material, a cathode having, for example, iron disulfide as the active material, and an electrolyte including an organic solvent and an aluminum salt selected from the group consisting of aluminum iodide and aluminum tri(sec-butoxide).

23 Claims, 4 Drawing Sheets

U.S. PATENT DOCUMENTS

| | | | |
|---|---|---|---|
| 7,285,356 | B2 | 10/2007 | Issaev et al. |
| 2003/0070283 | A1 | 4/2003 | Webber |
| 2004/0096737 | A1* | 5/2004 | Kim et al. .................. 429/199 |
| 2005/0112462 | A1 | 5/2005 | Marple |
| 2005/0277023 | A1 | 12/2005 | Marple et al. |
| 2006/0046152 | A1 | 3/2006 | Webber |
| 2006/0046153 | A1 | 3/2006 | Webber |
| 2006/0046154 | A1 | 3/2006 | Webber et al. |

FOREIGN PATENT DOCUMENTS

| | | |
|---|---|---|
| GB | 2 054 948 | 2/1981 |
| JP | 1-146261 | 6/1989 |
| JP | 7-142090 | 6/1995 |
| JP | 2005-251516 | 9/2005 |
| JP | 2006 100164 | 4/2006 |

OTHER PUBLICATIONS

Ishikawa et al., "Pretreatment of Li metal anode with electrolyte additive for enhancing LI cycleability", Journal of Power Sources, vol. 146, pp. 199-203, 2005.

Ishikawa et al., "In Situ Vibrating Electrode Technique for the Characterization of Interface Between Lithium Electrode and Electrolytes Containing Additives", Journal of the Electrochemical Society, vol. 141, No. 12, Dec. 1994.

* cited by examiner

BATTERY WITH ELECTROLYTE CONTAINING ALUMINUM SALT

TECHNICAL FIELD

The invention relates to batteries, as well as to related components and methods.

BACKGROUND

Batteries or electrochemical cells are commonly used electrical energy sources. A battery contains a negative electrode, typically called the anode, and a positive electrode, typically called the cathode. The anode contains an active material that can be oxidized; the cathode contains or consumes an active material that can be reduced. The anode active material is capable of reducing the cathode active material.

When a battery is used as an electrical energy source in a device, electrical contact is made to the anode and the cathode, allowing electrons to flow through the device and permitting the respective oxidation and reduction reactions to occur to provide electrical power. An electrolyte in contact with the anode and the cathode contains ions that flow through the separator between the electrodes to maintain charge balance throughout the battery during discharge.

One type of battery includes an alkali metal as the anode active material and iron disulfide as the cathode active material.

SUMMARY

The invention relates to batteries having (1) an anode including an alkali metal; (2) a cathode including a cathode active material selected from the group consisting of transition metal polysulfides, such as iron disulfide, having the formula $M1_a M2_b S_n$, wherein M1 and M2 are transition metals, a+b is at least 1, and n is at least 2×(a+b), and (3) an electrolyte including an organic solvent and an aluminum salt selected from the group consisting of aluminum iodide and aluminum tri(sec-butoxide). The electrolyte thus can include one or both aluminum salts and, optionally, other aluminum salts. In the transition metal polysulfide formula, M1 and M2 can be the same or different transition metals. When M1 and M2 are the same transition metal, b is zero. The anode material includes, for example, at least about 100% by weight and up to about 90% by weight of anode active material. The batteries generally have good safety characteristics, limited gas evolution, and good high current discharge properties.

Embodiments of the battery may include one or more of the following features. The solvent includes a sulfolane, 1,3-dioxolane, 1,2-dimethoxyethane, and/or tetrahydrofuran. The electrolyte includes a lithium salt such as lithium bis (trifluoromethanesulfonyl)imide. The alkali metal is lithium and can be, for example, pure lithium metal or lithium alloyed with another metal such as aluminum. The electrolyte further includes pyridine. The electrolyte includes from 50 ppm to 10,000 ppm of the aluminum salt.

Other aspects of the invention relate to methods of using and making the batteries described above.

"A sulfolane", as used herein, encompasses the molecule sulfolane as well as methyl, ethyl, and dimethyl sulfolane.

Other features and advantages will be apparent from the detailed description, the drawings, and from the claims.

DETAILED DESCRIPTION

Figure 1:
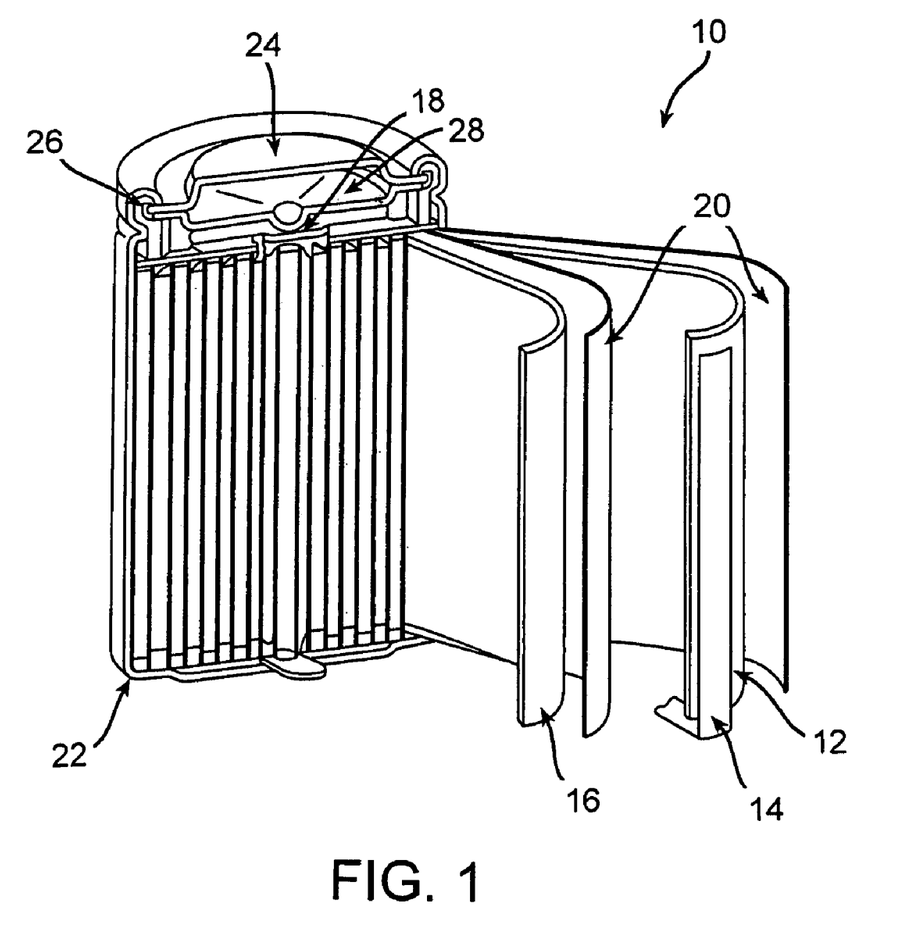
FIG. 1 is a sectional view of an embodiment of a non-aqueous electrochemical cell.

Referring to FIG. 1, a primary electrochemical cell 10 includes an anode 12 in electrical contact with a negative lead 14, a cathode 16 in electrical contact with a positive lead 18, a separator 20, and an electrolyte. Anode 12, cathode 16, separator 20, and the electrolyte are contained within a case 22. The electrolyte includes an organic solvent and an aluminum salt selected from the group consisting of aluminum iodide and aluminum tri(sec-butoxide). Electrochemical cell 10 further includes a cap 24 and an annular insulating gasket 26, as well as a safety valve 28.

Cathode 16 includes a cathode current collector and a cathode material that is coated on at least one side of the cathode current collector. The cathode material includes the cathode active material(s) and can also include one or more conductive materials (e.g., conductive aids, charge control agents) and/or one or more binders.

The cathode active material can include one or more transition metal polysulfides having the formula $M1_a M2_b S_n$, wherein M1 and M2 are transition metals, a+b is at least 1, and n is at least 2×(a+b). In some embodiments, n is 2. In other embodiments, n is greater than 2.5 or 3.0. Examples of transition metals include cobalt, copper, nickel, and iron. Examples of transition metal polysulfides include $FeS_2$, $CoS_2$, $NiS_2$, $MoS_2$, $Co_2S_9$, $Co_2S_7$, $Ni_2S_7$, and $Fe_2S_7$, $Mo_2S_3$, and $NiCoS_7$. Transition metal polysulfides are described further, for example, in Bowden et al., U.S. Pat. No. 4,891,283 and Bowden et al., U.S. Pat. No. 4,481,267. The cathode material includes, for example, at least about 85% by weight and/or up to about 92% by weight of cathode active material.

The conductive materials can enhance the electronic conductivity of cathode 16 within electrochemical cell 10. Examples of conductive materials include conductive aids and charge control agents. Specific examples of conductive materials include carbon black, graphitized carbon black, acetylene black, and graphite. The cathode material includes, for example, at least about 3% by weight and up to about 8% by weight of one or more conductive materials.

The binders can help maintain homogeneity of the cathode material and can enhance the stability of the cathode. Examples of binders include linear di- and tri-block copolymers. Additional examples of binders include linear tri-block polymers cross-linked with melamine resin; ethylene-propylene copolymers; ethylene-propylene-diene terpolymers; tri-block fluorinated thermoplastics; fluorinated polymers; hydrogenated nitrile rubber; fluoro-ethylene-vinyl ether copolymers; thermoplastic polyurethanes; thermoplastic olefins; styrene-ethylene-butylene-styrene block copolymers; and polyvinylidene fluoride homopolymers. The cathode material includes, for example, at least about 1% by weight (e.g., azt least about 3% by weight) and/or up to about 5% by weight of one or more binders.

The cathode current collector can be formed, for example, of one or more metals and/or metal alloys. Examples of metals include titanium, nickel, and aluminum. Examples of metal alloys include aluminum alloys (e.g., 1N30, 1230) and stainless steel. The current collector generally can be in the form of a foil or a grid. The foil can have, for example, a thickness of up to about 35 microns and/or at least about 20 microns.

Cathode 16 can be formed by first combining one or more cathode active materials, conductive materials, and binders with one or more solvents to form a slurry (e.g., by dispersing the cathode active materials, conductive materials, and/or binders in the solvents using a double planetary mixer), and then coating the slurry onto the current collector, for example, by extension die coating or roll coating. The coated current collector is then dried and calendered to provide the desired thickness and porosity.

Anode 12 includes one or more alkali metals (e.g., lithium, sodium, potassium) as the anode active material. The alkali metal may be the pure metal or an alloy of the metal. Lithium is the preferred metal; lithium can be alloyed, for example, with an alkaline earth metal or aluminum. The lithium alloy may contain, for example, at least about 50 ppm and up to about 5000 ppm (e.g., at least about 500 ppm and up to about 2000 ppm) of aluminum or other alloyed metal. The lithium or lithium alloy can be incorporated into the battery in the form of a foil.

Alternatively, anode 12 can include a particulate material such as lithium-insertion compounds, for example, $LiC_6$, $Li_4Ti_5O_{12}$, $LiTiS_2$ as the anode active material. In these embodiments, anode 12 can include one or more binders. Examples of binders include polyethylene, polypropylene, styrene-butadiene rubbers, and polyvinylidene fluoride (PVDF). The anode composition includes, for example, at least about 2% by weight and up to about 5% by weight of binder. To form the anode, the anode active material and one or more binders can be mixed to form a paste which can be applied to a substrate. After drying, the substrate optionally can be removed before the anode is incorporated into the housing.

The anode includes, for example, at least about 90% by weight and up to about 100% by weight of anode active material.

The electrolyte preferably is in liquid form. The electrolyte has a viscosity, for example, of at least about 0.2 cps (e.g., at least about 0.5 cps) and up to about 2.5 cps (e.g., up to about 2 cps or up to about 1.5 cps). As used herein, viscosity is measured as kinematic viscosity with a Ubbelohde calibrated visometer tube (Cannon Instrument Company; Model C558) at 22° C.

Preferred solvents include sulfolanes, 1,2-dimethoxyethane, 1,3-dioxolane, and tetrahydrofuran The electrolyte optionally can include other solvents (e.g., carbonates) such as those described in U.S. Pat. Appl. Pub. 2005/0277023. When the electrolyte contains a sulfolane, the electrolyte includes, for example, at least about 1% by volume (e.g., at least about 5% by volume, at least about 10% by volume, or at least about 15% by volume) and/or, for example, up to about 30% by volume (e.g., up to about 25% by volume or up to about 20% by volume) of the sulfolane and, for example, at least about 70% by volume (e.g., at least about 80% by volume) and/or up to about 99% by volume (e.g., up to about 90% by volume) of the other solvents.

The electrolyte may also include vinyl acetate and/or other viscosity-reducing monomers. The electrolyte includes, for example, at least about 0.5% by volume (e.g., at least about 2.5% by volume or at least 5% by volume) and/or up to about 20% by volume (e.g., up to about 15% by volume or up to about 10% by volume) of vinyl acetate and/or other viscosity lowering monomers The electrolyte includes, for example, at least about 50 ppm (e.g., at least about 100 ppm or at least about 200 ppm) and/or up to about 15,000 ppm (e.g., up to about 10,000 ppm, up to about 5,000 ppm, up to about 1000 ppm or up to about 600 ppm) of aluminum iodide and/or aluminum tri(sec-butoxide).

The electrolyte may include one or more lithium salts. Preferred lithium salts include lithium bis(trifluoromethanesulfonyl)imide ($LiN(SO_2CF_3)_2$), lithium trifluoromethanesulfonate ($LiSO_3CF_3$), and lithium iodide (LiI). Other examples of lithium salts include lithium hexafluorophosphate ($LiPF_6$), lithium bis(oxalato)borate ($LiB(C_2O_4)_2$), and lithium bis(perfluoroethyl sulfonyl)imide ($LiN(SO_2C_2F_5)_2$). Examples of other salts are described in Suzuki et al., U.S. Pat. No. 5,595,841 and in Totir et al., U.S. Pat. App. Pub. 2005/0202320 A1. The electrolyte includes, for example, at least about 0.1 M (e.g., at least about 0.5 M or at least about 0.7 M) and/or up to about 2 M (e.g., up to about 1.5 M or up to about 1.0 M) of the lithium salts.

The electrolyte may include pyridine as a scavenger for any acidic species present in the electrolyte which might react with the ether compound such as dioxolane, THF, etc. The electrolyte includes, for example, at least about 0.05% by weight and/or up to about 1% by weight (e.g., up to about 0.5% by weight) of the pyridine.

Positive lead 18 can include stainless steel, aluminum, an aluminum alloy, nickel, titanium, or steel. Positive lead 18 can be annular in shape, and can be arranged coaxially with the cylinder of a cylindrical cell. Positive lead 18 can also include radial extensions in the direction of cathode 16 that can engage the current collector. An extension can be round (e.g., circular or oval), rectangular, triangular or another shape. Positive lead 18 can include extensions having different shapes. Positive lead 18 and the current collector are in electrical contact. Electrical contact between positive lead 18 and the current collector can be achieved by mechanical contact. In some embodiments, positive lead 18 and the current collector can be welded together.

Separator 20 can be formed of any of the standard separator materials used in electrochemical cells. For example, separator 20 can be formed of polypropylene (e.g., nonwoven polypropylene, microporous polypropylene), polyethylene, and/or a polysulfone. Separators are described, for example, in Blasi et al., U.S. Pat. No. 5,176,968. The separator may also be, for example, a porous insulating polymer composite layer (e.g., polystyrene rubber and finely divided silica).

Case 22 can be made of, for example, one or more metals (e.g., aluminum, aluminum alloys, nickel, nickel plated steel, stainless steel) and/or plastics (e.g., polyvinyl chloride, polypropylene, polysulfone, ABS, polyamide).

Cap 24 can be made of, for example, aluminum, nickel, titanium, or steel.

While electrochemical cell 10 in FIG. 1 is a primary cell, in some embodiments a secondary cell can have a cathode that includes the above-described cathode active material. Primary electrochemical cells are meant to be discharged (e.g., to exhaustion) only once, and then discarded. Primary cells are not intended to be recharged. Primary cells are described, for example, in David Linden, *Handbook of Batteries* (McGraw-Hill, 2d ed. 1995). Secondary electrochemical cells can be recharged for many times (e.g., more than fifty times, more than a hundred times, or more). In some cases, secondary cells can include relatively robust separators, such as those having many layers and/or that are relatively thick. Secondary cells can also be designed to accommodate for changes, such as swelling, that can occur in the cells. Secondary cells are described, for example, in Falk & Salkind, "Alkaline Storage Batteries", John Wiley & Sons, Inc. 1969, and DeVirloy et al., U.S. Pat. No. 345,124.

To assemble the cell, separator 20 can be cut into pieces of a similar size as anode 12 and cathode 16 and placed therebetween. Anode 12, cathode 16, and separator 20 are then placed within case 22, which is then filled with the electrolytic solution and sealed. One end of case 22 is closed with cap 24 and annular insulating gasket 26, which can provide a gas-tight and fluid-tight seal. Positive lead 18 connects cathode 16 to cap 24. Safety valve 28 is disposed in the inner side of cap 24 and is configured to decrease the pressure within electrochemical cell 10 when the pressure exceeds some predetermined value. Methods for assembling an electrochemical cell are described, for example, in Moses, U.S. Pat. No. 4,279,972, Moses et al., U.S. Pat. No. 4,401,735, and Kearney et al., U.S. Pat. No. 4,526,846.

Other configurations of an electrochemical cell can also be used, including, for example, the button or coin cell configuration, the prismatic cell configuration, the rigid laminar cell configuration, and the flexible pouch, envelope or bag cell configuration. Furthermore, an electrochemical cell can have any of a number of different voltages (e.g., 1.5 V, 3.0 V, 4.0 V). Electrochemical cells having other configurations are described, for example, in Berkowitz et al., U.S. Ser. No. 10/675,512, filed 09/30/2003 now abandoned, and U.S. Pat. App. Pub. 2005/0112467 A1.

The following examples are meant to be illustrative and not to be limiting.

EXAMPLE 1

0.0346 g of aluminum tri(sec-butoxide) was added into 10 g of an electrolyte containing 0.8 M lithium bis(trifluoromethanesulfonyl)imide in a mixture of sulfolane and 1,3-dioxolane (v/v=1:4) along with 0.1% pyridine by weight (the electrolyte is dubbed as GF-4). The performance of the electrolyte with and without the aluminum additive was evaluated in coin cells made by laminating 31 mil-thick Li foil (diameter: 9"/16)/separator (Celgard 2400, diameter 11"/16)/$FeS_2$ electrode containing w/w 88$FeS_2$-8 carbon black-4 Kraton G (diameter 7"/16). Coin cells of this general type are described in U.S. Pat. No. 6,159,636. Kraton G is a tradename for a type of styrene-ethylene-butylene-styrene block copolymer.

Figure 2:
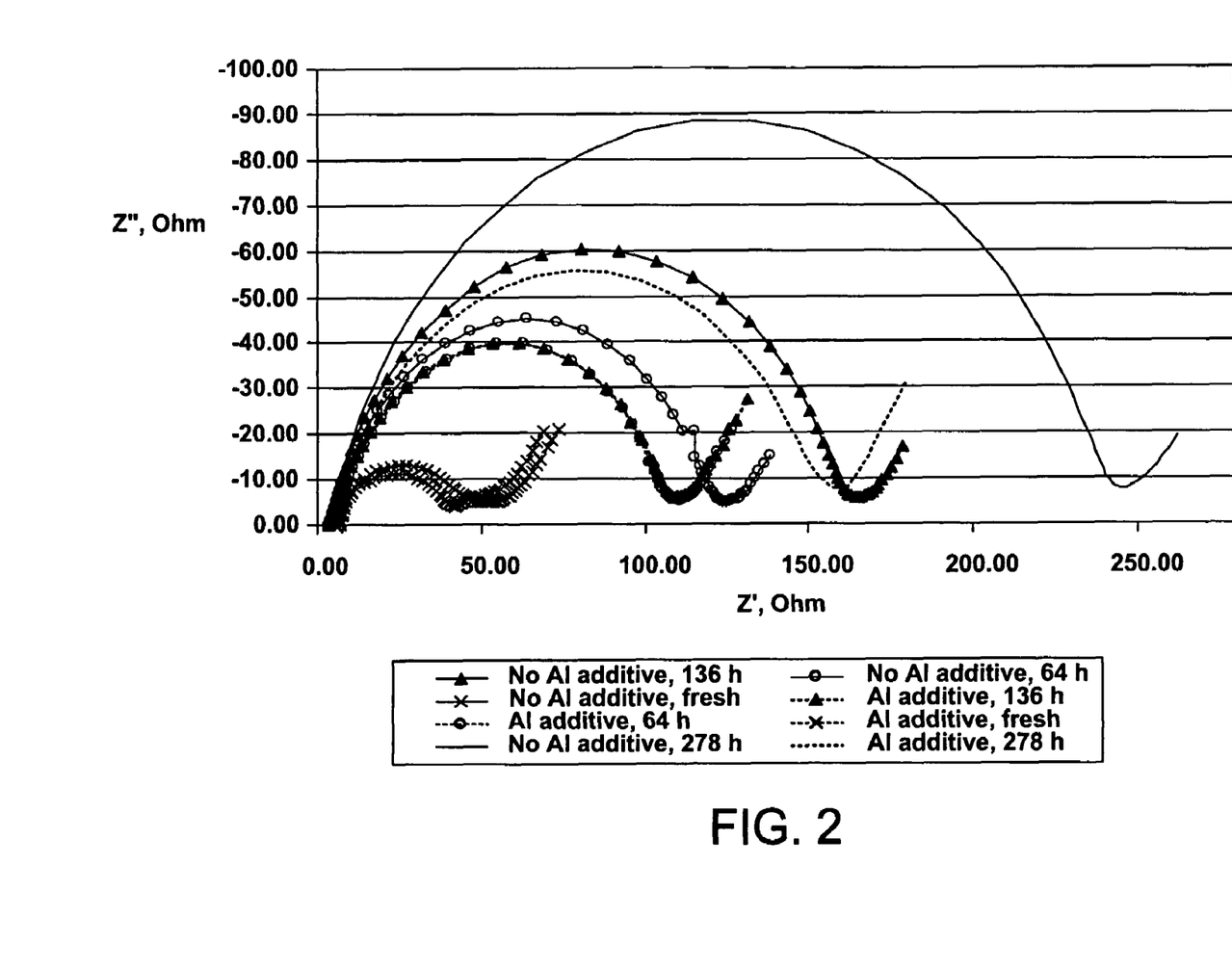
FIG. 2 is a graph showing impedance spectra at various times for two batteries.
Figure 3:
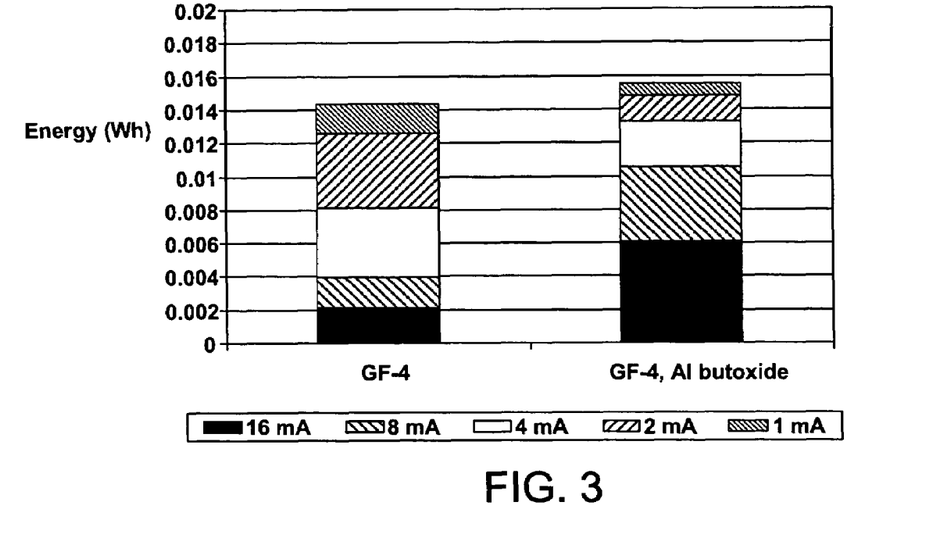
FIG. 3 is a graph showing discharge data for two batteries.

The impedance spectra of the cells stored at 71° C. are shown in FIG. 2. The aluminum additive in the electrolyte significantly slows the resistance development of the passivation film formed on the surface of the Li anode. Depicted in FIG. 3 are the discharge data for the cells stored at 71° C. for 278 hours. The cell with the aluminum additive delivers higher rate capability.

EXAMPLE 2

0.0492 g of aluminum iodide was added into 10 g of an electrolyte containing 0.8 M lithium bis(trifluoromethanesulfonyl)imide in a mixture of 1,2-dimethoxyethane and tetrahydrofuran (w/w=3:7). The electrolyte is dubbed as Ferro-B. The performance of the electrolyte with and without the aluminum additive was evaluated in coin cells and assembled by laminating 31 mil-thick Li foil (diameter: 9"16)/separator (Celgard 2400, diameter 11"/16)/$FeS_2$ electrode containing (w/w) 88$FeS_2$-8 carbon black-4 Kraton G (diameter 7"/16).

Figure 4:
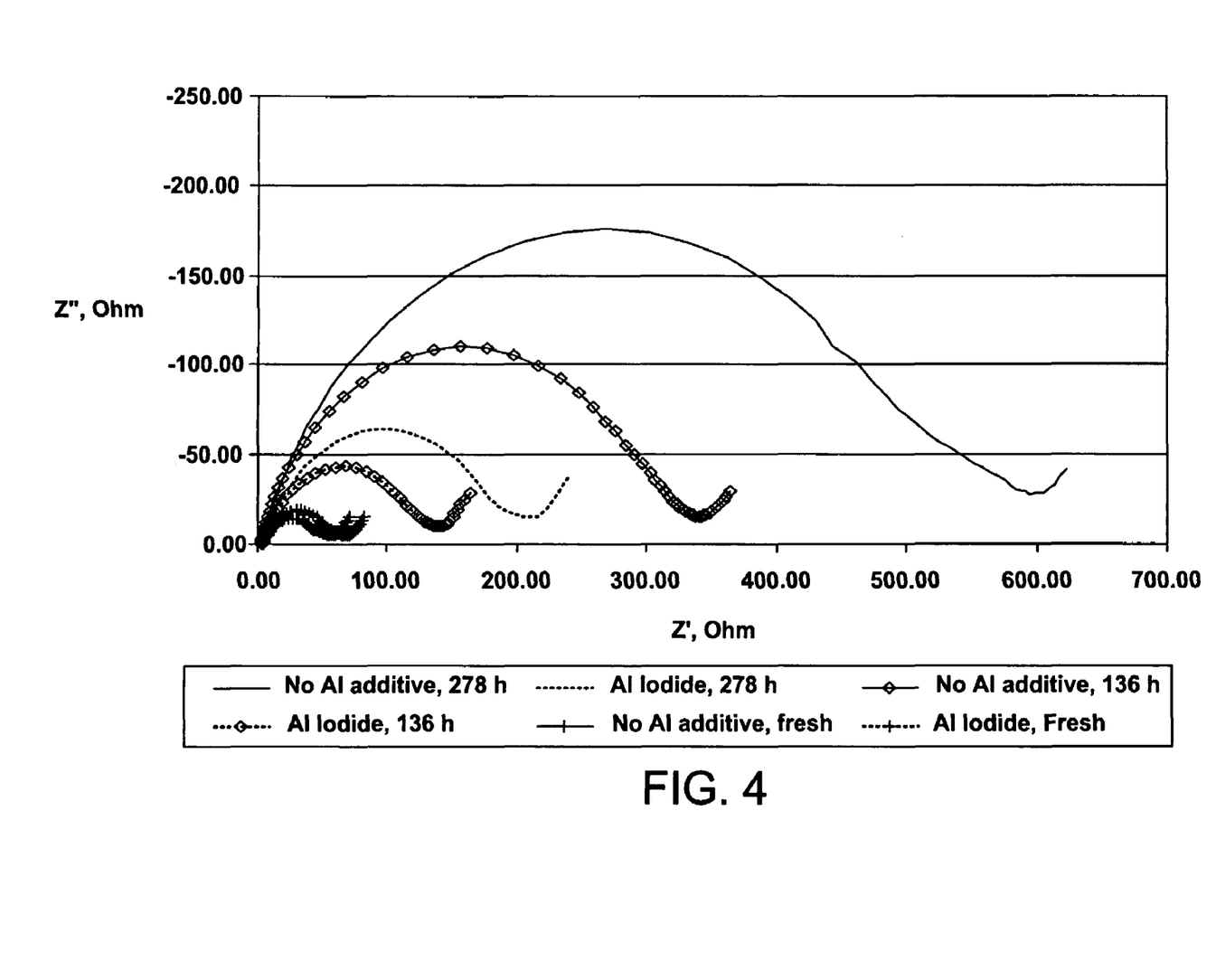
FIG. 4 is a graph showing impedance spectra at various times for two batteries.
Figure 5:
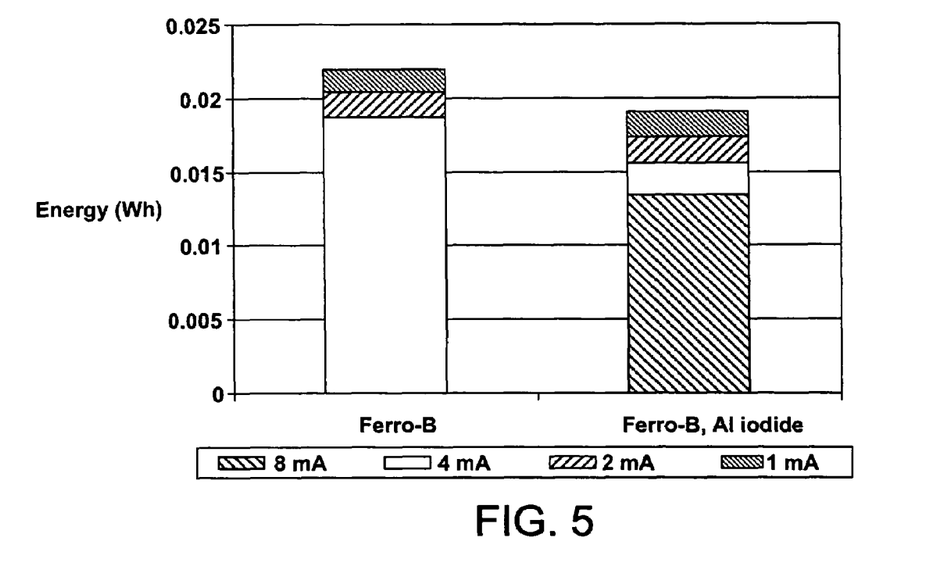
FIG. 5 is a graph showing discharge data for two batteries.

The impedance spectra of the cells stored at 71° C. are shown in FIG. 4. The aluminum additive in the electrolyte significantly slows the resistance development of the passivation film formed on the surface of the Li anode. Depicted in FIG. 5 are the discharge data for the cells stored at 71° C. for 278 hours. Again, the cell with the aluminum additive in the electrolyte delivers higher rate capability.

All references, such as patent applications, publications, and patents, referred to herein are incorporated by reference in their entirety.

Other embodiments are in the claims.

What is claimed is:

1. A battery, comprising a housing, and within the housing:
   (a) an anode comprising an alkali metal;
   (b) a cathode comprising a cathode active material selected from the group consisting of transition metal polysulfides having the formula $M1_a M2_b S_n$, wherein M1 and M2 are transition metals, a+b is at least 1, and n is at least 2× (a+b); and
   (c) an electrolyte comprising an organic solvent and an aluminum salt wherein the aluminum salt is aluminum tri(sec-butoxide).

2. The battery of claim 1, wherein the solvent includes a sulfolane.

3. The battery of claim 1, wherein the solvent includes 1,3-dioxolane.

4. The battery of claim 1, wherein the solvent includes 1,2-dimethoxyethane.

5. The battery of claim 1, wherein the solvent includes tetrahydrofuran.

6. The battery of claim 1, wherein the electrolyte further comprises a lithium salt.

7. The battery of claim 6, wherein the lithium salt comprises bis(trifluoromethanesulfonyl)imide.

8. The battery of claim 1, wherein the alkali metal is lithium.

9. The battery of claim 8, wherein the lithium metal is alloyed with aluminum.

10. The battery of claim 1, wherein the cathode active material is iron disulfide.

11. The battery of claim 1, wherein the alkali metal is lithium, the cathode active material is iron disulfide, and the electrolyte comprises an organic solvent selected from the group consisting of sulfolane, 1,3-dioxolane, 1,2-dimethoxyethane, and tetrahydrofuran.

12. The battery of claim 1, wherein the electrolyte further comprises pyridine.

13. The battery of claim 1, wherein the electrolyte includes from 50 ppm to 15,000 ppm of the aluminum salt.

14. The battery of claim 1, wherein the electrolyte includes from 100 ppm to 5,000 ppm of the aluminum salt.

15. The battery of claim 1, wherein the electrolyte includes from 200 ppm to 1,000 ppm of the aluminum salt.

16. A battery, comprising a housing, and within the housing:
   (a) an anode comprising Li;
   (b) a cathode comprising $FeS_2$; and
   (c) an electrolyte comprising sulfolane, 1,3-dioxolane, pyridine, and aluminum tri(sec-butoxide).

17. The battery of claim 16, wherein the electrolyte further comprises tetrahydrofuran.

18. The battery of claim 16, wherein the electrolyte further comprises bis(trifluoromethanesulfonyl)imide.

19. A battery, comprising a housing, and within the housing:
   (a) an anode comprising Li;
   (b) a cathode comprising $FeS_2$; and (c) an electrolyte comprising 1,2-dimethoxyethane and tetrahydrofuran, and aluminum tri(sec-butoxide).

20. The battery of claim 19, wherein the electrolyte further comprises pyridine.

21. The battery of claim 19, wherein the electrolyte further comprises bis(trifluoromethanesulfonyl)imide.

22. A battery, comprising a housing, and within the housing:
  (a) an anode comprising Li;
  (b) a cathode comprising $FeS_2$; and
  (c) an electrolyte comprising an organic solvent selected from the group consisting of sulfolane, 1,3-dioxolane, 1,2-dimethoxyethane, and tetrahydrofuran, and an aluminum salt wherein the aluminum salt is aluminum tri(sec-butoxide).

23. The battery of claim 22, wherein the electrolyte further comprises bis(trifluoromethanesulfonyl)imide.

* * * * *

UNITED STATES PATENT AND TRADEMARK OFFICE
CERTIFICATE OF CORRECTION

| | |
|---|---|
| PATENT NO. | : 7,648,798 B2 |
| APPLICATION NO. | : 11/494246 |
| DATED | : January 19, 2010 |
| INVENTOR(S) | : Jiang et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 758 days.

Signed and Sealed this

Twenty-third Day of November, 2010

David J. Kappos
*Director of the United States Patent and Trademark Office*